(12) United States Patent
Forslund et al.

(10) Patent No.: US 10,230,460 B2
(45) Date of Patent: Mar. 12, 2019

(54) METHOD AND OPTICAL LINK MANAGEMENT FUNCTION FOR OBTAINING OPTICAL POWER LEVEL FOR AN OPTICAL LINK

(71) Applicant: Telefonaktiebolaget LM Ericsson (publ), Stockholm (SE)

(72) Inventors: Anders Forslund, Skellefteå (SE); Mats Johansson, Älvsjö (SE); Tom Rehnström, Märsta (SE); Hans Von Goes, Stockholm (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 15/772,811

(22) PCT Filed: Nov. 4, 2015

(86) PCT No.: PCT/SE2015/051165
§ 371 (c)(1),
(2) Date: May 1, 2018

(87) PCT Pub. No.: WO2017/078583
PCT Pub. Date: May 11, 2017

(65) Prior Publication Data
US 2018/0323868 A1 Nov. 8, 2018

(51) Int. Cl.
*H04B 10/077* (2013.01)
*H04B 10/079* (2013.01)
*H04B 10/564* (2013.01)

(52) U.S. Cl.
CPC ....... *H04B 10/0775* (2013.01); *H04B 10/079* (2013.01); *H04B 10/564* (2013.01)

(58) Field of Classification Search
CPC .. H04B 10/0775; H04B 10/564; H04B 10/00; H04B 10/032; H04B 10/071; H04B 10/0771; H04B 10/079
See application file for complete search history.

(56) References Cited

U.S. PATENT DOCUMENTS

| | | | |
|---|---|---|---|
| 6,915,076 B1 * | 7/2005 | Mittal | H04B 10/07955 375/317 |
| 2002/0027703 A1 * | 3/2002 | Kinoshita | H01S 3/06758 359/337.1 |

(Continued)

FOREIGN PATENT DOCUMENTS

| WO | 03085897 A1 | 10/2003 |
|---|---|---|
| WO | 2006003164 A1 | 1/2006 |

(Continued)

OTHER PUBLICATIONS

International Search Report and Written Opinion for International Application No. PCT/SE2015/051165, dated Aug. 12, 2016, 14 pages.

(Continued)

*Primary Examiner* — Ted M Wang
(74) *Attorney, Agent, or Firm* — NDWE LLP

(57) ABSTRACT

An Optical Link Management Function "OLMF" for obtaining an optical power level for an optical link between a first and a second optical transformation modules. The OLMF sends a first message instructing a first unit to feed a set of optical transmissions representing at least one bit pattern. The OLMF sends a second message instructing the first optical transformation module to transmit the set of optical transmissions at optical power levels in a range. The OLMF sends a third message instructing a second unit to register successful or unsuccessful decoding of the set of optical transmissions based on the bit pattern. The OLMF receives a set of indications representing successful or unsuccessful (Continued)

decoding of the set of optical transmissions at the optical power levels. The OLMF finds a lowest optical power level for which an optical transmission of the set on the optical link is successfully decoded.

19 Claims, 3 Drawing Sheets

(56) References Cited

U.S. PATENT DOCUMENTS

2005/0207754 A1   9/2005   Yamaguchi et al.
2008/0002973 A1   1/2008   Yamabana et al.

FOREIGN PATENT DOCUMENTS

WO   2012112801 A2   8/2012
WO   2015133946 A1   9/2015

OTHER PUBLICATIONS

Emmanouel A. Varvarigos et al., "The slow start power controlled MAC protocol for mobile ad hoc networks and its performance analysis," 2008, pp. 1136-1149, Elsevier B.V.
"Diagnostic Monitoring Interface for Optical Transceivers," Nov. 21, 2014, 41 pages, SFF-8472, Rev 12.2.
International Preliminary Report on Patentability for Application No. PCT/SE2015/051165, dated May 17, 2018, 9 pages.

* cited by examiner

METHOD AND OPTICAL LINK MANAGEMENT FUNCTION FOR OBTAINING OPTICAL POWER LEVEL FOR AN OPTICAL LINK

CROSS-REFERENCE TO RELATED APPLICATIONS

This application is a National stage of International Application No. PCT/SE2015/051165, filed Nov. 4, 2015, which is hereby incorporated by reference.

TECHNICAL FIELD

Embodiments herein relate to communication systems, such as data center systems. In particular, a method and an Optical Link Management Function for obtaining an optical power level for an optical link between a first and a second optical transformation module are disclosed. A corresponding computer program and a carrier therefor are also disclosed.

BACKGROUND

A communication system is sometimes hosted in a data center system. In the data center system, an optical interconnect is often used to interconnect various components of the data center system. Optical interconnect is typically preferred due to its small dimensions and superior transmission capabilities. The various components include compute/storage/memory/switch sleds mounted in one or more chassis. The optical interconnect can connect one or more chassis and/or one or more sleds within one or more chassis. As a further example, the optical interconnect may interconnect sleds with a back/mid-plane of a chassis or other data center equipment.

In this context, the optical interconnect is exposed to high and/or hot air flows, vibrations and other temperature variations as a few examples. Accordingly, the environment in which the optical interconnect is used is very tough, or rough. A disadvantage is hence that the optical interconnect may degrade, e.g. provide less reliable and/or slower connection, due to the tough environment.

A known communication system, such as a telecommunication system, may be hosted in a data center of the above mentioned kind by an operator of the telecommunication system. The data center typically comprises components as mentioned above that are connected with an optical interconnect comprising a plurality of optical links. The components include optical modules for transformation of electrical signals into optical signals to be carried on the optical links. This means that each optical link has a first optical module at one end and a second optical module at the other end. For supervision optical parameters of the optical link, a known Diagnostic Monitoring Interface (DMI) is typically used. Typical optical parameters include optical power, received optical power, transmitted optical power, laser bias current, temperature, supply voltage, etc. The optical parameters are typically set at manufacturing of the optical modules. A problem is however that the optical parameters may not always be accurately set for the data center in which the components and the optical links are actually installed.

SUMMARY

An object may hence be to improve management of optical parameters in a communication system of the above mentioned kind.

According to an aspect, the object is achieved by a method, performed by an Optical Link Management Function (OLMF), for obtaining an optical power level for an optical link between a first optical transformation module and a second optical transformation module, wherein the optical link is capable of carrying optical transmissions transferable between the first and second optical transformation modules, wherein the first optical transformation module is capable of converting electrical signals to the optical transmissions, wherein a second optical transformation module is capable of converting the optical transmissions to further electrical signals, wherein the first optical transformation module is accessible via a first interface for handling at least the optical power level of the optical transmissions. The method comprises a set of actions as described in the following. The OLMF sends, to a first unit connected to the first optical transformation module, a first message instructing the first unit to feed a set of optical transmissions representing at least one bit pattern onto the optical link by means of the first optical transformation module. The OLMF sends, to the first optical transformation module via the first interface, a second message instructing the first optical transformation module to transmit the set of optical transmissions at optical power levels ranging from a first optical power level to a second optical power level; The OLMF sends, to a second unit, a third message instructing the second unit to register successful or unsuccessful decoding of the set of optical transmissions based on said at least one bit pattern. The OLMF receives, from the second unit, a set of indications representing successful or unsuccessful decoding of the set of optical transmissions at the optical power levels. The OLMF finds, among the optical power levels, a lowest optical power level for which an optical transmission of the set on the optical link is successfully decoded by the second unit.

According to another aspect, the object is achieved by an Optical Link Management Function (OLMF) configured for obtaining an optical power level for an optical link between a first optical transformation module and a second optical transformation module, wherein the optical link is capable of carrying optical transmissions transferable between the first and second optical transformation modules, wherein the first optical transformation module is capable of converting electrical signals to the optical transmissions, wherein a second optical transformation module is capable of converting the optical transmissions to further electrical signals, wherein the first optical transformation module is accessible via a first interface for handling at least the optical power level of the optical transmissions. The Optical Link Management Function is configured to perform a set of actions. The set of actions comprises: sending, to a first unit connected to the first optical transformation module, a first message instructing the first unit to feed a set of optical transmissions representing at least one bit pattern onto the optical link by means of the first optical transformation module. Moreover, the set of actions comprises sending, to the first optical transformation module via the first interface, a second message instructing the first optical transformation module to transmit the set of optical transmissions at optical power levels ranging from a first optical power level to a second optical power level. Furthermore, the set of actions comprises sending, to a second unit, a third message instructing the second unit to register successful or unsuccessful decoding of the set of optical transmissions based on said at least one bit pattern. Additionally, the set of actions comprises receiving, from the second unit, a set of indications representing successful or unsuccessful decoding of the set of optical transmissions at the optical power levels. The set of actions further comprises finding, among the optical power levels, a lowest optical power level for which an optical transmission of the set on the optical link is successfully decoded by the second unit.

According to further aspects, the object is achieved by a computer program and a carrier therefor corresponding to the aspects above.

Thanks to that the OLMF has access to both the first unit and the second unit, the OLMF is able to instruct the first unit and the first optical transformation module to send a known set of transmissions. Then, the OLMF instructs the second unit to register successful or unsuccessful decoding of the known set of transmissions. Among the registrations of decoding, the OLMF finds the lowest optical power level for which a successful registration of decoding was obtained. In this manner, an optical parameter, e.g. the optical power level for transmissions on the optical link, is accurately determined regardless any existing degradation of the optical link.

An advantage is that reliability of the optical link is increased, i.e. the optical power level is adapted to actual condition, e.g. none, little, medium or much degradation of the optical link.

BRIEF DESCRIPTION OF THE DRAWINGS

The various aspects of embodiments disclosed herein, including particular features and advantages thereof, will be readily understood from the following detailed description and the accompanying drawings, in which.

DETAILED DESCRIPTION

Figure 1:
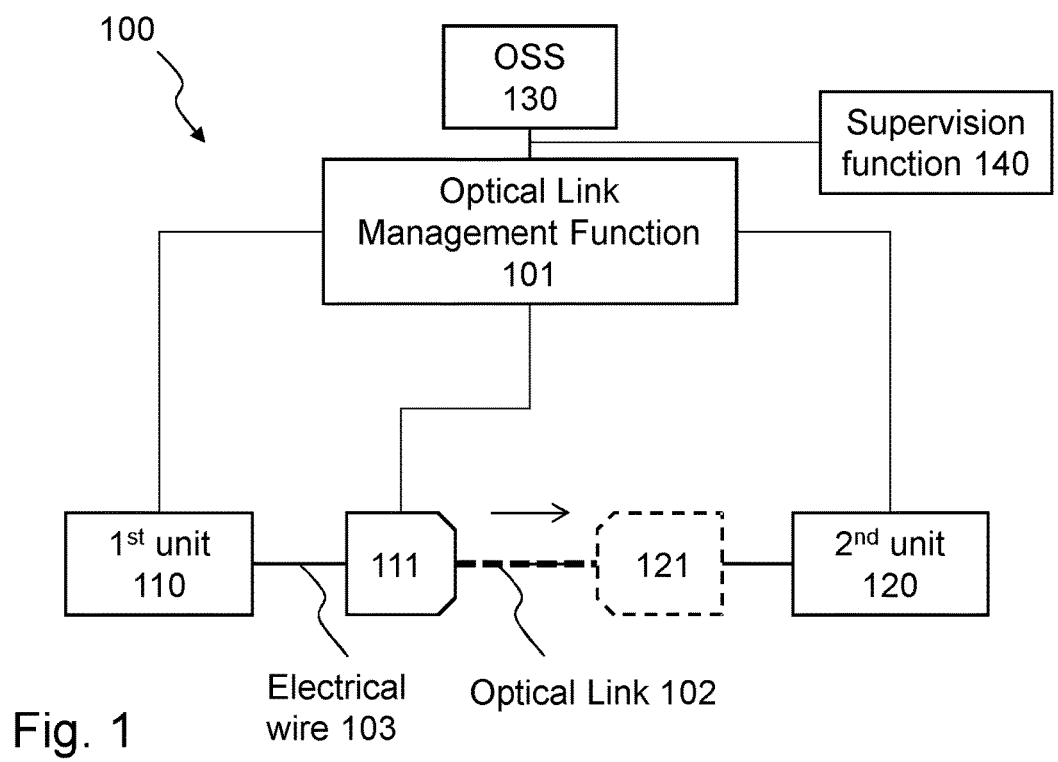
FIG. 1 is a schematic overview of an exemplifying system in which embodiments herein may be implemented.

Throughout the following description similar reference numerals have been used to denote similar features, such as functions, modules, nodes, actions, steps, circuits, parts, items, elements, units or the like, when applicable. In the Figures, features that appear in some embodiments are indicated by dashed lines.

Optical link performance is essential for the operator's network reliability, and in big data centers a huge amount of optical connections are done and it is essential that you have full control of that in order to prevent unwanted downtime due to unplanned troubleshooting instead of planned maintenance.

FIG. 1 depicts an exemplifying system 100 in which embodiments herein may be implemented. The system 100 may be included in a data center, which e.g. may host a communication system. The communication system may be any wired or wireless communication system, such as any Third Generation Partnership Project (3GPP) system or the like. Examples of the communication system include, but are not limited to, a Global System for Mobile communication, a Long Term Evolution (LTE), Universal Mobile Telecommunication System (UMTS) and Worldwide Interoperability for Microwave Access (WiMAX) system.

For this disclosure, emphasis is an Optical Link Management Function (OLMF) 101 which is capable of supervision, configuring and monitoring an optical link 102, such as an optical fiber, optical wire, opto-transmission line or the like.

The optical link 102 provides a connection between a first unit 110 and a second unit 120. The connection may typically carry data, such as user data and/or control data. The embodiments herein are equally applicable for any kind of data carried on the optical link 102. As used herein, the term "unit" may refer to a component of a data center, which typically may be included in its own chassis. The unit may be a blade or a sled for providing compute/storage/memory/switch capability (and/or compute/storage/memory/switch capacity).

At one end of the optical link 102 a first optical transformation module 111 is provided. The first unit 110 may comprise the first optical transformation module 111 (not shown). Alternatively, as shown in FIG. 1, the first unit 110 and the first optical transformation module 111 may be co-located while being connected to each other by an electrical wire 103.

Moreover, at another end of the optical link a second optical transformation module 121 is provided. Similarly to the first optical transformation module 111, the second unit 120 may comprise the second optical transformation module 121, or the second optical transformation module 121 may be co-located with the second unit 120.

As used herein, the term "optical transformation module" may refer to Small Form-Factor Pluggable(s) (SFP), Board Mounted Optics (BMOs) or the like.

Furthermore, the system typically comprises an Operation and Support System (OSS) 130, which handles various operation and support functions of the communication system.

Additionally, the system 100 may comprise a supervision function 140. In some systems, the supervision function 140 may be referred to as an Equipment Management Gateway (EMG). The supervision function 140 may be responsible for setting up virtual server machines by virtually assembling components of the system.

Figure 2:
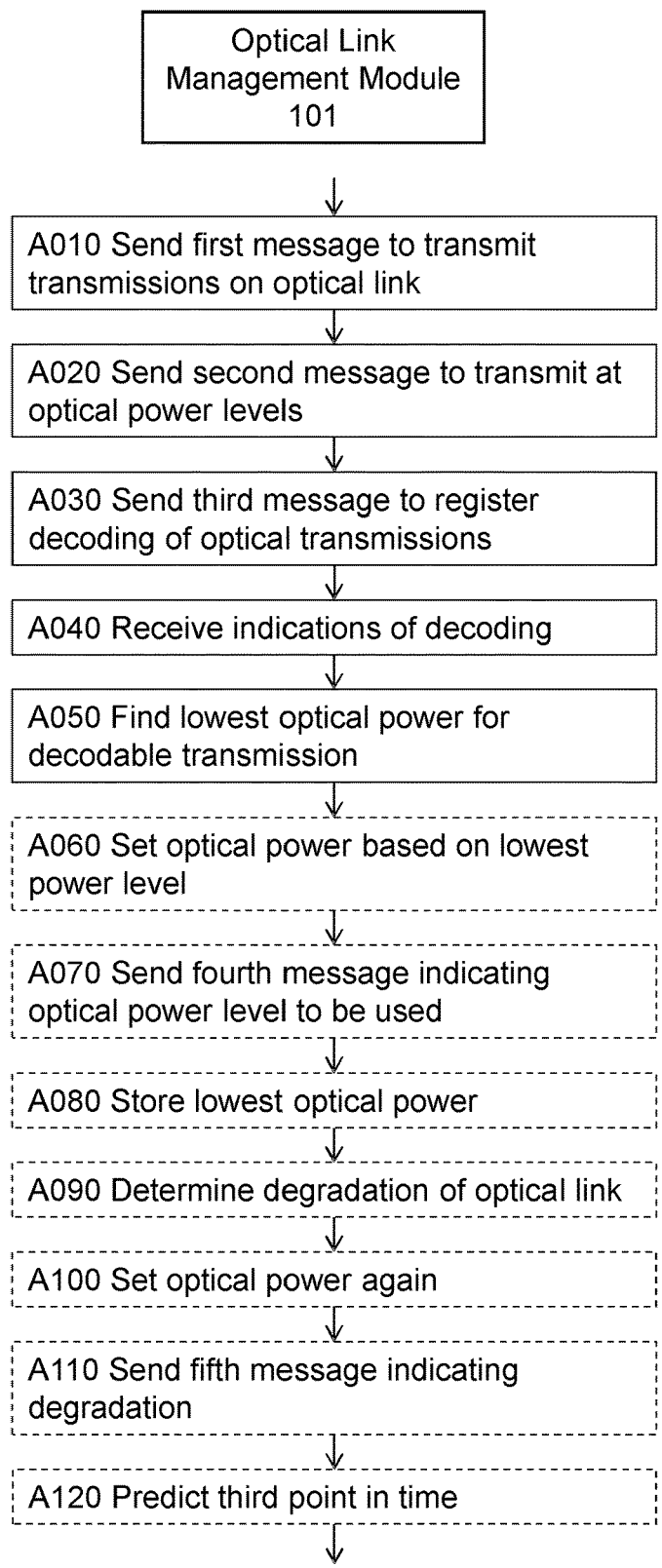
FIG. 2 is a flowchart illustrating embodiments of the method in the Optical Link Management Function.

FIG. 2 illustrates an exemplifying method according to embodiments herein when implemented in the system 100 of FIG. 1. Accordingly, the OLMF 101 performs a method for obtaining an optical power level for an optical link 102 between the first optical transformation module 111 and the second optical transformation module 121. The optical link 102 is capable of carrying optical transmissions transferable between the first and second optical transformation modules 111, 121, i.e. the optical link 102 does not need to currently carry any user data and/or control data.

As mentioned, the first optical transformation module 111 is capable of converting electrical signals to the optical transmissions. The second optical transformation module 121 is capable of converting the optical transmissions to further electrical signals.

The first optical transformation module 111 is accessible via a first interface, such as the DMI interface, or an evolution thereof, mentioned in the background section, for handling at least the optical power level of the optical transmissions.

One or more of the following actions may be performed in any suitable order. The method comprises a set of actions, i.e. action A010 to action A050, which may be performed repeatedly. As an example, the set of actions is performed at a plurality of points in time including a first and a second point in time. The plurality of points in time may be spaced apart in time by a regular or irregular interval. Moreover, the set of actions may be performed at request, upon instruction to start/stop etc. The manners of repeating the set of actions may be combined in various ways.

Action A010

In order to enable creation of a bit patter to be received by the second unit 120, the OLMF 101 sends, to the first unit 110 connected to the first optical transformation module 111, a first message instructing the first unit 110 to feed a set of optical transmissions representing at least one bit pattern onto the optical link 102 by means of the first optical transformation module 111. This means e.g. that one or more known bit patterns may be used. The known bit pattern refers to that the second unit is, or will be made, aware of the known bit pattern. Hence, the known bit pattern is any specific bit pattern that the first unit 110 and the second unit 120 both are aware of.

The first message may comprise the optical power levels to use or a set of bias currents to use when the first optical transformation module 111 sends the optical transmissions.

Action A020

The OLMF 101 sends, to the first optical transformation module 111 via the first interface, a second message instructing the first optical transformation module 111 to transmit the set of optical transmissions at optical power levels ranging from a first optical power level to a second optical power level. This means that a transmission of the set of optical transmissions is achieved.

The first optical power level is typically less than the second optical power level.

Action A030

The OLMF 101 sends, to the second unit 120, a third message instructing the second unit 120 to register successful or unsuccessful decoding of the set of optical transmissions based on the at least one bit pattern. Since the second unit 120 receives the set of optical transmissions, the second unit 120 will, in response to the third message, register whether or not the second unit 120 successfully or unsuccessfully decodes the set of optical transmissions, where e.g. each optical transmission may cause the second unit 120 to register True for successful decoding and False for unsuccessful decoding.

An order in which the OLMF 101 performs action A010, action A020 and action A030 may vary from what is exemplified above. However, regardless the order of action A010, action A020 and action A030, the first and second units 110, 120 may preferably have a common understanding of when the optical transmissions are to be sent from the first unit 110 to the second unit 120. Other exemplifying orders of the actions are: A030, A020, A010; A020, A010, A030; A010, A030, A020; A030, A010, A020; and A020, A030, A010; etc.

At this stage, although not performed by the OLMF 101, the first unit 110 sends the set of optical transmissions at some points in time, which are known to both the first unit 110 and the second unit 120. It shall be noted that transmission of any other data is interrupted when the set of optical transmissions are transmitted.

As instructed in action A030, the second unit 120 may then register the successful or unsuccessful decoding of the set of optical transmissions. Thereafter, the second unit 120 sends a set of indications representing successful or unsuccessful decoding of the set of optical transmissions at the optical power levels.

Action A040

Then, the OLMF 101 receives, from the second unit 120, the set of indications representing successful or unsuccessful decoding. As a result, the second unit 120 has informed the OLMF 101 of an outcome of the transmission of the set of optical transmissions.

Successful or unsuccessful decoding may refer to identification of bit errors in the decoded transmissions.

Action A050

Subsequently to action A040, the OLMF 101 finds A050, among the optical power levels, a lowest optical power level for which an optical transmission of the set on the optical link 102 is successfully decoded by the second unit 120. In this manner, the OLMF 101 identifies the lowest optical power level which still allows the second unit 120 to successfully decode a particular transmission, i.e. one of the transmissions of the set of optical transmissions.

The lowest optical power level is typically in a range of optical power levels extending from the first optical power level to the second optical power level.

As mentioned above, the set of actions may be performed a plurality of times. Advantageously, supervision of various problems related to optical link degradation, laser cross-talk, cable kinks, and the like may be achieved. However, the method disclosed herein does also provide actions to postpone degradation by setting the optical power level as explain in action A060 below.

Action A060

The OLMF 101 may set, based on the lowest optical power level, a specific optical power level to be used by the first optical transformation module 111 when transmitting the optical transmissions.

In some examples, the OLMF 101 may set the specific optical power level by calculating the specific optical power level as a sum of the lowest optical power level and a margin value. The margin values may be expressed in relative terms of the lowest optical power level or in absolute terms as a value, e.g. 1 mW or less or any other suitable value.

Expressed differently, the setting of the specific optical power level may comprise calculating the specific optical power level as a sum of the lowest optical power level and a margin value.

An advantage may be that the specific optical power level may be set according to actual conditions. This may mean that power save may be obtained when actual conditions so allow compared to default setting of the first optical transformation module 111.

Action A070

Now in order to ensure that the first optical transformation module 111 actually transmits optical transmissions at the specific optical power level, the OLMF 101 may send, to the first optical transformation module 111 e.g. via the first interface, a fourth message indicating the specific optical power level.

Action A080

The OLMF 101 may store the lowest optical power level. In this manner, the lowest optical power level may be compared to a current optical power level as will be describe further below.

Action A090

In some examples, the set of actions, e.g. action A010, A020, A030, A040 and A050, may be performed at a first point in time and at a second point in time. As is evident, this merely means that the sequence of actions: A010, A020, A030, A040 and A050, is performed at least twice. A first round of performing the actions starts at the first point in time and a second round starts at the second point in time.

The OLMF 101 may determine that the optical link 102 has degraded, when a corresponding lowest optical power for the first point in time is less than a corresponding lowest optical power for the second point in time.

In contrast, the OLMF 101 may determine that the optical link 102 has not degraded, when the corresponding lowest optical power for the first point in time is less than the corresponding lowest optical power for the second point in time.

In some examples, action A100 and/or action 110 may be performed to adjust optical power level or to send a warning message. Typically, one or both of these actions may be performed in response to the determining A090 that the optical link has degraded.

Hence, we have that:

Action A100

The OLMF 101 may set a corresponding specific optical power level for the second point based on the corresponding lowest optical power for the second point in time.

And as mentioned, additionally or alternatively to action A100:

Action A110

The OLMF 101 may send, to a supervision function 140, a fifth message indicating that the optical link 102 has degraded. Here, the fifth message may be the warning message.

Action A120

In a yet further embodiments, the OLMF 101 may predict, based on the lowest optical power level for the first point in time and the lowest optical power level for the second point in time, a third point in time at which the specific optical power level exceeds a maximum optical power level of the first optical transformation module 111.

At the third point in time, the optical transmissions on the optical link are thus lost or desired reliability is not achieved.

This means that the OLMF 101 may find and analyse trends thanks to the predictions of the optical power level. For example, the OLMF 101 may predict when the optical link will fail, e.g. at the third point in time.

Figure 3:
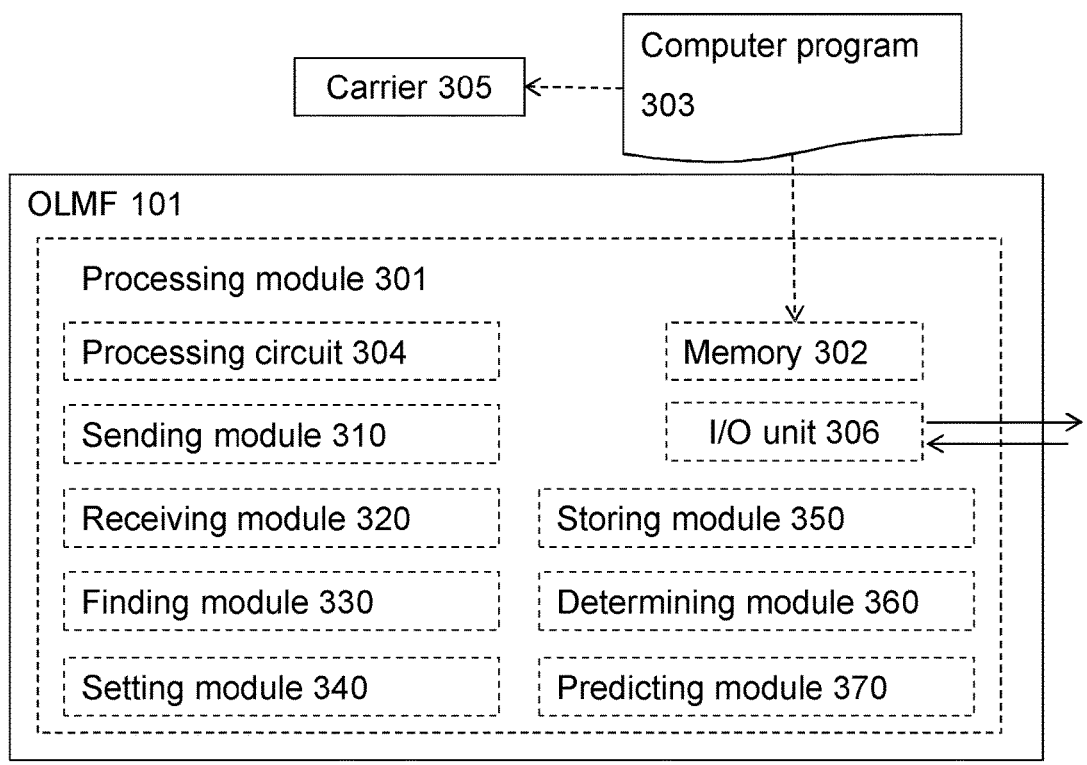
FIG. 3 is a block diagram illustrating embodiments of the Optical Link Management Function.

With reference to FIG. 3, a schematic block diagram of embodiments of the OLMF 101 of FIG. 1 is shown.

The OLMF 101 may comprise a processing module 301, such as a means, one or more hardware modules and/or one or more software modules for performing the methods described herein.

The OLMF 101 may further comprise a memory 302. The memory may comprise, such as contain or store, a computer program 303.

According to some embodiments herein, the processing module 301 comprises, e.g. 'is embodied in the form of' or 'realized by', a processing circuit 304 as an exemplifying hardware module. In these embodiments, the memory 302 may comprise the computer program 303, comprising computer readable code units executable by the processing circuit 304, whereby the OLMF 101 is operative to perform the methods of FIG. 2.

In some other embodiments, the computer readable code units may cause the OLMF 101 to perform the method according to FIG. 2 when the computer readable code units are executed by the OLMF 101.

FIG. 3 further illustrates a carrier 305, or program carrier, which comprises the computer program 303 as described directly above.

In some embodiments, the processing module 301 comprises an Input/Output module 306, which may be exemplified by a receiving module and/or a sending module as described below when applicable.

In further embodiments, the processing module 301 may comprise one or more of a sending module 310, a receiving module 320, a finding module 330, a setting module 340, a storing module 350, a determining module 360 and a predicting module 370 as exemplifying hardware modules. In other examples, one or more of the aforementioned exemplifying hardware modules may be implemented as one or more software modules.

Accordingly, the OLMF 101 is configured for obtaining an optical power level for an optical link 102 between a first optical transformation module 111 and a second optical transformation module 121, wherein the optical link 102 is capable of carrying optical transmissions transferable between the first and second optical transformation modules 111, 121, wherein the first optical transformation module 111 is capable of converting electrical signals to the optical transmissions, wherein a second optical transformation module 121 is capable of converting the optical transmissions to further electrical signals, wherein the first optical transformation module 111 is accessible via a first interface for handling at least the optical power level of the optical transmissions, wherein the Optical Link Management Function 101 is configured to perform a set of actions.

The set of actions comprises sending, to a first unit 110 connected to the first optical transformation module 111, a first message instructing the first unit 110 to feed a set of optical transmissions representing at least one bit pattern onto the optical link 102 by means of the first optical transformation module 111. The OLMF 101 and/or the processing module 301 and/or the sending module 310 is/are configured to perform this action.

Moreover, the set of actions comprises sending, to the first optical transformation module 111 via the first interface, a second message instructing the first optical transformation module 111 to transmit the set of optical transmissions at optical power levels ranging from a first optical power level to a second optical power level. The OLMF 101 and/or the processing module 301 and/or the sending module 310, or a further sending module (not shown) is/are configured to perform this action.

Furthermore, the set of actions comprises sending, to a second unit 120, a third message instructing the second unit 120 to register successful or unsuccessful decoding of the set of optical transmissions based on the at least one bit pattern. The OLMF 101 and/or the processing module 301 and/or the sending module 310, or a still further sending module (not shown) is/are configured to perform this action.

Additionally, the set of actions comprises receiving, from the second unit 120, a set of indications representing successful or unsuccessful decoding of the set of optical transmissions at the optical power levels. The OLMF 101 and/or the processing module 301 and/or the receiving module 320 is/are configured to perform this action.

The set of actions further comprises finding, among the optical power levels, a lowest optical power level for which an optical transmission of the set on the optical link 102 is successfully decoded by the second unit 120. The OLMF 101 and/or the processing module 301 and/or the finding module 330 is/are configured to perform this action.

In some embodiments, the OLMF 101 and/or the processing module 301 and/or the setting module 340 may be configured for setting, based on the lowest optical power level, a specific optical power level to be used by the first optical transformation module 111 when transmitting the optical transmissions. In these embodiments, the OLMF 101 and/or the processing module 301 and/or the sending module 310, or a yet other sending module (not shown), may be configured for sending, to the first optical transformation module 111, a fourth message indicating the specific optical power level.

The OLMF 101 and/or the processing module 301 and/or the storing module 350 may be configured for storing the lowest optical power level.

The OLMF 101 and/or the processing module 301 and/or the setting module 340 may be configured for setting the specific optical power level by calculating the specific optical power level as a sum of the lowest optical power level and a margin value.

In some embodiments, the set of actions may be performed at a first point in time and at a second point in time, wherein the Optical Link Management Function 101 and/or the processing circuit 304 and/or the determining module 360 may be configured for determining that the optical link 102 has degraded, when a corresponding lowest optical power for the first point in time is less than a corresponding lowest optical power for the second point in time.

The Optical Link Management Function 101 and/or the processing circuit 304 may be configured for performing the set of actions repeatedly.

The Optical Link Management Function 101 and/or the processing circuit 304 and/or the setting module 340, or a further setting module (not shown), may be configured for, in response to the determining that the optical link has degraded, setting a corresponding specific optical power level for the second point based on the corresponding lowest optical power for the second point in time. Moreover, the Optical Link Management Function 101 and/or the processing circuit 304 and/or the sending module 310, or a still other sending module (not shown) may be configured for sending, to a supervision function 140, a fifth message indicating that the optical link 102 has degraded.

The Optical Link Management Function 101 and/or the processing circuit 304 and/or the predicting module 370 may be configured for predicting, based on the lowest optical power level for the first point in time and the lowest optical power level for the second point in time, a third point in time at which the specific optical power level exceeds a maximum optical power level of the first optical transformation module 111.

The first message may comprise the optical power levels to use or a set of bias currents to use when the first optical transformation module 111 sends the optical transmissions.

As used herein, the term "Function" may refer to one or more functional units, each of which may be implemented as one or more hardware modules and/or one or more software modules.

As used herein, the term "program carrier", or "carrier", may refer to one of an electronic signal, an optical signal, a radio signal, and a computer readable medium. In some examples, the program carrier may exclude transitory, propagating signals, such as the electronic, optical and/or radio signal. Thus, in these examples, the carrier may be a non-transitory carrier, such as a non-transitory computer readable medium.

As used herein, the term "processing module" may include one or more hardware modules, one or more software modules or a combination thereof. Any such module, be it a hardware, software or a combined hardware-software module, may be a determining means, estimating means, capturing means, associating means, comparing means, identification means, selecting means, receiving means, sending means or the like as disclosed herein. As an example, the expression "means" may be a module corresponding to the modules listed above in conjunction with the Figures.

As used herein, the term "software module" may refer to a software application, a Dynamic Link Library (DLL), a software component, a software object, an object according to Component Object Model (COM), a software component, a software function, a software engine, an executable binary software file or the like.

As used herein, the term "processing circuit" may refer to a processing unit, a processor, an Application Specific integrated Circuit (ASIC), a Field-Programmable Gate Array (FPGA) or the like. The processing circuit or the like may comprise one or more processor kernels.

As used herein, the expression "configured to/for" may mean that a processing circuit is configured to, such as adapted to or operative to, by means of software configuration and/or hardware configuration, perform one or more of the actions described herein.

As used herein, the term "action" may refer to an action, a step, an operation, a response, a reaction, an activity or the like. It shall be noted that an action herein may be split into two or more sub-actions as applicable. Moreover, also as applicable, it shall be noted that two or more of the actions described herein may be merged into a single action.

As used herein, the term "memory" may refer to a hard disk, a magnetic storage medium, a portable computer diskette or disc, flash memory, random access memory (RAM) or the like. Furthermore, the term "memory" may refer to an internal register memory of a processor or the like.

As used herein, the term "computer readable medium" may be a Universal Serial Bus (USB) memory, a DVD-disc, a Blu-ray disc, a software module that is received as a stream of data, a Flash memory, a hard drive, a memory card, such as a MemoryStick, a Multimedia Card (MMC), Secure Digital (SD) card, etc. One or more of the aforementioned examples of computer readable medium may be provided as one or more computer program products.

As used herein, the term "computer readable code units" may be text of a computer program, parts of or an entire binary file representing a computer program in a compiled format or anything there between.

As used herein, the expression "transmit" and "send" are considered to be interchangeable. These expressions include transmission by broadcasting, uni-casting, group-casting and the like. In this context, a transmission by broadcasting may be received and decoded by any authorized device within range. In case of uni-casting, one specifically addressed device may receive and decode the transmission. In case of group-casting, a group of specifically addressed devices may receive and decode the transmission.

As used herein, the terms "number" and/or "value" may be any kind of digit, such as binary, real, imaginary or rational number or the like. Moreover, "number" and/or "value" may be one or more characters, such as a letter or a string of letters. "Number" and/or "value" may also be represented by a string of bits, i.e. zeros and/or ones.

As used herein, the term "set of" may refer to one or more of something. E.g. a set of devices may refer to one or more devices, a set of parameters may refer to one or more parameters or the like according to the embodiments herein.

As used herein, the expression "in some embodiments" has been used to indicate that the features of the embodiment described may be combined with any other embodiment disclosed herein.

Further, as used herein, the common abbreviation "e.g.", which derives from the Latin phrase "exempli gratia," may be used to introduce or specify a general example or examples of a previously mentioned item, and is not intended to be limiting of such item. If used herein, the common abbreviation "i.e.", which derives from the Latin phrase "id est," may be used to specify a particular item from a more general recitation. The common abbreviation "etc.", which derives from the Latin expression "et cetera" meaning "and other things" or "and so on" may have been used herein to indicate that further features, similar to the ones that have just been enumerated, exist.

Even though embodiments of the various aspects have been described, many different alterations, modifications and the like thereof will become apparent for those skilled in the art. The described embodiments are therefore not intended to limit the scope of the present disclosure.

The invention claimed is:

1. A method, performed by an Optical Link Management Function, for obtaining an optical power level for an optical link between a first optical transformation module and a second optical transformation module, wherein the optical link is capable of carrying optical transmissions transferable between the first and second optical transformation modules, wherein the first optical transformation module is capable of converting electrical signals to the optical transmissions, wherein a second optical transformation module is capable of converting the optical transmissions to further electrical signals, wherein the first optical transformation module is accessible via a first interface for handling the optical power levels of the optical transmissions, the method comprising:

sending, to a first unit connected to the first optical transformation module, a first message instructing the first unit to feed a set of optical transmissions representing at least one bit pattern onto the optical link by the first optical transformation module;

sending, to the first optical transformation module via the first interface, a second message instructing the first optical transformation module to transmit the set of optical transmissions at optical power levels ranging from a first optical power level to a second optical power level where the first optical power level and the second optical power level are different optical power levels;

sending, to a second unit, a third message instructing the second unit to register successful or unsuccessful decoding of the set of optical transmissions based on the at least one bit pattern when transmitted from the first optical transformation module at optical power levels ranging from the first optical power level to the second optical power level;

receiving, from the second unit, a set of indications representing successful or unsuccessful decoding of the set of optical transmissions at the optical power levels transmitted by the first optical transformation module; and finding, among the optical power levels transmitted by the first optical transformation module, a lowest optical power level for which an optical transmission of the set of optical transmissions on the optical link is successfully decoded by the second unit.

2. The method according to claim 1, further comprising:
setting, based on the lowest optical power level, a specific optical power level to be used by the first optical transformation module when transmitting the optical transmissions; and
sending, to the first optical transformation module, a fourth message indicating the specific optical power level.

3. The method according to claim 1, wherein the method comprises:
storing the lowest optical power level.

4. The method according to claim 2, wherein the setting of the specific optical power level comprises calculating the specific optical power level as a sum of the lowest optical power level and a margin value.

5. The method according to claim 1, wherein the method is performed at a first point in time and at a second point in time, wherein the method further comprises:
when a corresponding lowest optical power for the first point in time is less than a corresponding lowest optical power for the second point in time, determining that the optical link has degraded.

6. The method according to claim 5, wherein the method performed repeatedly.

7. The method according to claim 5, wherein the method further comprises, in response to the determining that the optical link has degraded, performing at least one of:
setting a corresponding specific optical power level for the second point based on the corresponding lowest optical power for the second point in time; and
sending, to a supervision function, a fifth message indicating that the optical link has degraded.

8. The method according to claim 7, wherein the method further comprises:
predicting, based on the lowest optical power level for the first point in time and the lowest optical power level for the second point in time, a third point in time at which a specific optical power level exceeds a maximum optical power level of the first optical transformation module.

9. The method according to claim 1, wherein the first message comprises the optical power levels to use or a set of bias currents to use when the first optical transformation module sends the optical transmissions.

10. An Optical Link Management Function configured for obtaining an optical power level for an optical link between a first optical transformation module and a second optical transformation module, wherein the optical link is capable of carrying optical transmissions transferable between the first and second optical transformation modules, wherein the first optical transformation module is capable of converting electrical signals to the optical transmissions, wherein a second optical transformation module is capable of converting the optical transmissions to further electrical signals, wherein the first optical transformation module is accessible via a first interface for handling the optical power levels of the optical transmissions, the Optical Link Management Function comprising:
a processor; and
a memory containing computer code which, when executed by the processor, causes the Optical Link Management Function to perform operations to:
send, to a first unit connected to the first optical transformation module, a first message instructing the first unit to feed a set of optical transmissions representing at least one bit pattern onto the optical link by the first optical transformation module;
send, to the first optical transformation module via the first interface, a second message instructing the first optical transformation module to transmit the set of optical transmissions at optical power levels ranging from a first optical power level to a second optical power level where the first optical power level and the second optical power level are different optical power levels;
send, to a second unit, a third message instructing the second unit to register successful or unsuccessful decoding of the set of optical transmissions based on the at least one bit pattern when transmitted from the first optical transformation module at optical power levels ranging from the first optical power level to the second optical power level;

receive, from the second unit, a set of indications representing successful or unsuccessful decoding of the set of optical transmissions at the optical power levels transmitted by the first optical transformation module; and find, among the optical power levels transmitted by the first optical transformation module, a lowest optical power level for which an optical transmission of the set of optical transmissions on the optical link is successfully decoded by the second unit.

11. The Optical Link Management Function according to claim 10, wherein the Optical Link Management Function is configured to further perform operations to:

set, based on the lowest optical power level, a specific optical power level to be used by the first optical transformation module when transmitting the optical transmissions; and send, to the first optical transformation module, a fourth message indicating the specific optical power level.

12. The Optical Link Management Function according to claim 10, wherein the Optical Link Management Function is configured to store the lowest optical power level.

13. The Optical Link Management Function according to claim 11, wherein the Optical Link Management Function is configured to set the specific optical power level by performing operations to calculate the specific optical power level as a sum of the lowest optical power level and a margin value.

14. The Optical Link Management Function according to claim 10, wherein the operations are performed at a first point in time and at a second point in time, wherein the Optical Link Management Function is configured to determine that the optical link has degraded, when a corresponding lowest optical power for the first point in time is less than a corresponding lowest optical power for the second point in time.

15. The Optical Link Management Function according to claim 14, wherein the Optical Link Management Function is configured to perform the operations repeatedly.

16. The Optical Link Management Function according to claim 14, wherein the Optical Link Management Function is configured, in response to determining that the optical link has degraded, to further perform at least one of:

set a corresponding specific optical power level for the second point based on the corresponding lowest optical power for the second point in time; and send, to a supervision function, a fifth message indicating that the optical link has degraded.

17. The Optical Link Management Function according to claim 16, wherein the Optical Link Management Function is configured to predict, based on the lowest optical power level for the first point in time and the lowest optical power level for the second point in time, a third point in time at which a specific optical power level exceeds a maximum optical power level of the first optical transformation module.

18. The Optical Link Management Function according to claim 10, wherein the first message comprises the optical power levels to use or a set of bias currents to use when the first optical transformation module sends the optical transmissions.

19. A non-transitory computer readable storage medium containing computer readable code for an Optical Link Management Function, in which the Optical Link Management Function for obtaining an optical power level for an optical link between a first optical transformation module and a second optical transformation module, wherein the optical link is capable of carrying optical transmissions transferable between the first and second optical transformation modules, wherein the first optical transformation module is capable of converting electrical signals to the optical transmissions, wherein a second optical transformation module is capable of converting the optical transmissions to further electrical signals, wherein the first optical transformation module is accessible via a first interface for handling the optical power levels of the optical transmissions, wherein the computer readable code, when executed on a processor of the Optical Link Management Function, causes the Optical Link Management Function to perform operations comprising:

sending, to a first unit connected to the first optical transformation module, a first message instructing the first unit to feed a set of optical transmissions representing at least one bit pattern onto the optical link by the first optical transformation module;

sending, to the first optical transformation module via the first interface, a second message instructing the first optical transformation module to transmit the set of optical transmissions at optical power levels ranging from a first optical power level to a second optical power level where the first optical power level and the second optical power level are different optical power levels;

sending, to a second unit, a third message instructing the second unit to register successful or unsuccessful decoding of the set of optical transmissions based on the at least one bit pattern when transmitted from the first optical transformation module at optical power levels ranging from the first optical power level to the second optical power level;

receiving, from the second unit, a set of indications representing successful or unsuccessful decoding of the set of optical transmissions at the optical power levels transmitted by the first optical transformation module; and finding, among the optical power levels transmitted by the first optical transformation module, a lowest optical power level for which an optical transmission of the set of optical transmissions on the optical link is successfully decoded by the second unit.

* * * * *